Figure 1:
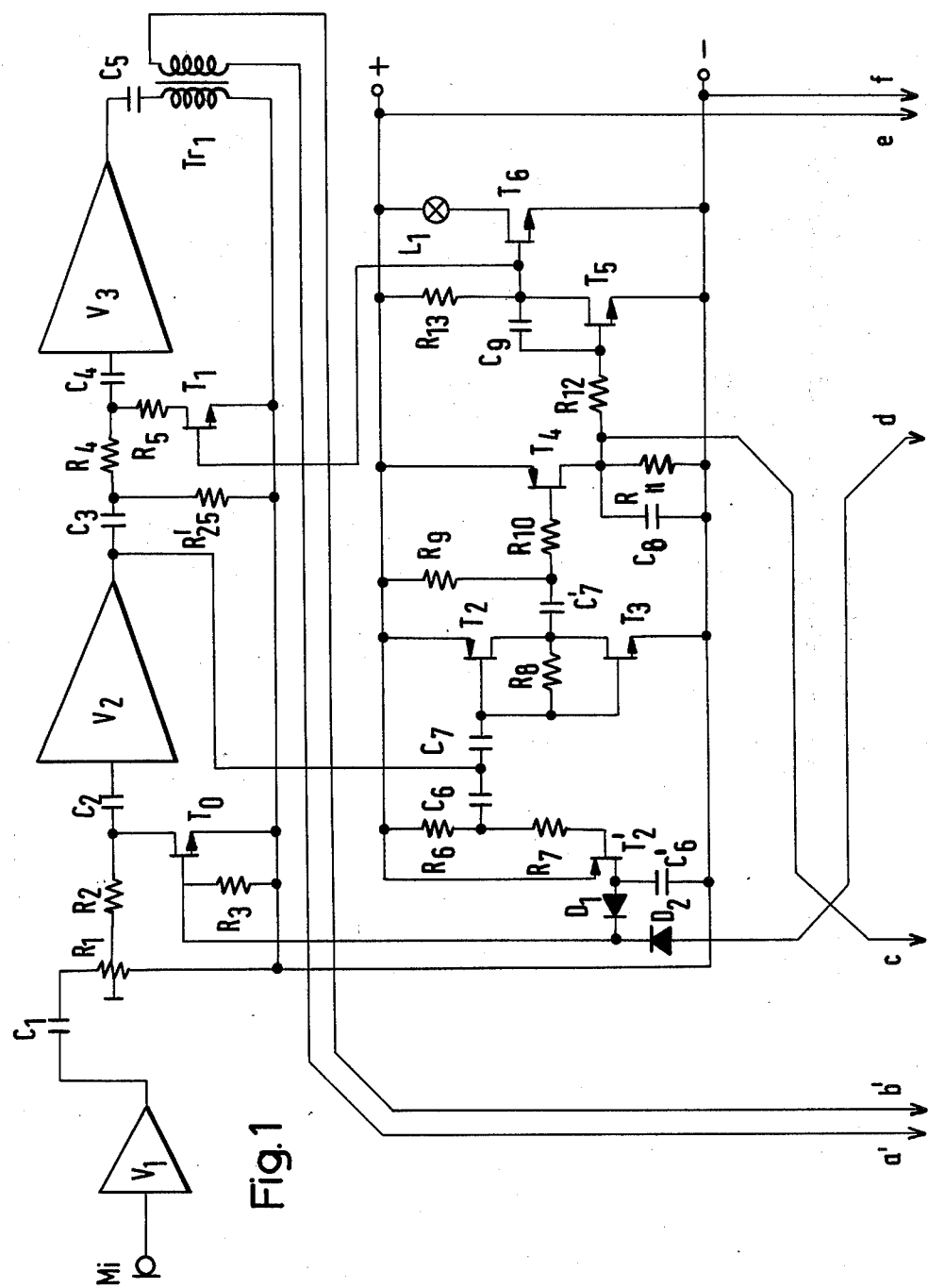

United States Patent [19]

Brosow

[11] 4,161,624

[45] Jul. 17, 1979

[54] HANDS-FREE TELEPHONE WITH CASCADED ATTENUATORS

[75] Inventor: Jörgen Brosow, Elsenwang, Austria

[73] Assignee: Dasy Inter S.A., Genf, Switzerland

[21] Appl. No.: 827,752

[22] Filed: Aug. 25, 1977

[30] Foreign Application Priority Data

Aug. 25, 1976 [DE] Fed. Rep. of Germany ....... 2638286

[51] Int. Cl.² ............................................. H04M 1/60
[52] U.S. Cl. ................................. 179/1 HF; 179/1 FS
[58] Field of Search ................ 179/1 H, 1 HF, 1 CN, 179/1 VC, 1 FS

[56] References Cited

U.S. PATENT DOCUMENTS

| | | | |
|---|---|---|---|
| 2,850,569 | 9/1958 | Flury | 179/1 H |
| 3,893,038 | 7/1975 | Omata et al. | 179/1 G |
| 3,925,618 | 12/1975 | Kato | 179/1 HF |
| 4,052,562 | 10/1977 | Andersen | 179/1 HF |

OTHER PUBLICATIONS

G. W. Reichard et al., "The 4A Speakerphone—A Hands-Down Winner," Bell Lab. Record., Sep. 1973, pp. 233–237.

Primary Examiner—William C. Cooper
Assistant Examiner—E. S. Kemeny
Attorney, Agent, or Firm—Nolte & Nolte

[57] ABSTRACT

A hands-free telephone set has both transmit and receive channels open for the reception of signals, while still inhibiting feedback-singing. Two switched attenuators are provided in cascade in each channel. The first attenuator is switched after a syllable delay, and the second attenuator is switched after a yet longer delay.

11 Claims, 2 Drawing Figures

HANDS-FREE TELEPHONE WITH CASCADED ATTENUATORS

The invention relates to a circuit arrangement for a hands free telephone, and more in particular to a hands free telephone having a signal transmission installation operative in two directions, with a sending channel modulated by the microphone of the hands free telephone and a receiving channel modulating the loudspeaker of the hands free telephone. The system is provided with amplifiers and attenuators for each channel, these devices being modulated for each transmission direction by control voltages which are derived from the speech currents transmitted in the opposite transmission direction.

Hands free telephones of this type are known, for example, from DT-PS No. 11 60 897. Their operation depends upon the use of amplifiers of variable gain factor. Control voltages derived from speech currents transmitted cause an increase in the gain of the amplifier of whichever transmission direction is carrying the respective speech current, and a reduction of gain or a blocking of the amplifier for the opposite transmission direction. The attenuation is therefore achieved in this case by reducing the gain or blocking the amplifier.

For a mode of operation of the hands free telephone which is comparable to the conventional telephone and therefore pleasant for the user, it is desirable for interrupt talk to be detectable. It is simultaneously necessary, however, to avoid acoustic feedback. The apparatus should be capable of functioning in the presence of high background noise. All these desiderata are difficult to combine, however, and are partially mutually contradictory.

Nevertheless, hands free telephones are known (DT-AS No. 17 62 486) which seek a solution of the problem while giving special consideration to the conditions of speech control. In this context it is noted that the speech control system to prevent the feedback whistle which is feared in the hands free telephone utilizes the fact that speech is generally alternate in normal telephone conversations. Therefore, the speech level generally diminishes at the end of speech in the one channel or in one transmission direction. Even within a speech sequence, pronounced maximum and minimum levels repeatedly follow each other rapidly due to the syllabic character of speech. Any attempt at interrupt talk can be detected with particular ease if it falls in a speech minimum of the counter-direction. Consequently very short time constants are necessary in the speech control means for a correct reversal of the transmission direction by interrupt talk. On the one hand, it is considered impossible to provide such short time constants generally, because in order to prevent faulty control operations, reverberation times in the space surrounding the speaking point, or body sound times in the case of a microphone and loudspeaker, combined in one housing, of the hands free telephone have to be taken into consideration in the speech control means in the form of a relatively large decay time constant in order to prevent faulty control and blockage of the hands free telephone. On the other hand, relatively long decay times also provide the advantage that in the normal case of alternate speech with intermediate pause, the transmission direction reversal proceeds more gently and is not disturbingly perceptible to the user of the hands free telephone. In the known apparatuses, compromises are necessary between these two contradictory desiderata. Thus, the shortest possible time constants are employed to permit interrupt talk on the one hand, and longest possible time constants are employed to prevent blockage by reverberation or body sound on the other hand. The resultant time constants consequently do not represent the optimum for either of the two desiderata.

It is therefore, the object of the invention to provide a hands free telephone wherein feedback whistle is reliably eliminated despite the presence of readily recognizable interrupt talk.

Briefly stated, this object is achieved according to the invention by employing a control voltage obtained from the speech current of one transmission direction to the modulation of the attenuator of the other transmission channel, and simultaneously through a delay circuit to cancel the attenuation of an additional attenuator preceding the final amplifier of the one transmission channel. In other words, in accordance with the invention a separate attenuator is provided preceding the first and second amplifiers of each channel, and a control circuit including a delay, is provided responsive to the output of the first amplifier of each channel for controlling the first attenuator of the other channel. The control circuit further includes a separate second delay circuit connected to receive the output of each first delay circuit, for developing a control voltage for the control of the second attenuator of the respective channel.

As will be explained in greater detail in the following paragraphs, the system of the present invention enables both of the channels to be open for the reception of speech signals, while still inhibiting the initiation of feedback-singing. As a consequence, it is now possible to design the delay times of the circuit in order to avoid undesirable effects, such as the existence of the impression of "dead connections."

It will be realized that, in accordance with the invention, a plurality of attenuators are present in each of the transmission channels and at different points of each transmission channels, and that these attenuators are furthermore modulated at different times. A speech voltage in one transmission channel then initially has the effect of operating a first attentuator, in the transmission direction, of the other transmission channel, i.e. said transmission channel is attenuated. A certain time constant must be chosen for this purpose, which can however be relatively short due to the construction of the circuit arrangement to be described hereinbelow. Simultaneously the first attenuator (in the transmission direction) in the transmission channel from which the speech voltage for the control voltage was obtained is conveniently modulated so that an amplitude control occurs in the sense of a limitation in order to prevent overmodulation. With such a procedure, feedback could still immediately occur, however, because the one transmission channel would be fully open whereas the other transmission channel would only just be attenuated. It is, therefore, decisive that an additional measure is provided according to the invention. Thus, in the transmission channel from which the speech voltage was derived, the first attenuator (in the transmission direction) or first amplifier stage is followed by a second attenuator which initially prevents any flow of a speech current into the final amplifier. This attenuator is modulated by the same control voltage derived from the speech voltage in the respective said transmission channel, but through an additional delay circuit, and thus clears the respective transmission channel only after a short additional delay. The additional delay is sufficient to ensure that the other transmission channel has meanwhile been so strongly attenuated tht it is impossible for feedback whistle to occur when the transmission channel from which the control voltage was derived is now cleared.

The two transmission channels are of identical construction with respect to this control system, and modulate each other in the same manner. It is therefore the essence of the invention that, starting from a transmission channel, not only is the respective other transmission channel modulated, but in addition a modulation of the one transmission channel itself occurs but with a time delay and at a point downstream in the transmission direction of the point of obtention of the control voltage from the speech current. It is quite decisive that this control system is applied to the receiving channel. Therefore, when a signal from a subscriber line reaches its second attenuator (in the transmission direction), said receiving channel is freed from attenuation and made viable to the loudspeaker of the hands free telephone by the part of the control circuit associated with the receiving channel, if attenuation has previously been applied by the same control circuit component from the sending channel. In the sending channel, on the other hand, the second attenuator (in the transmission direction) may possibly be omitted.

Feedback phenomena are therefore reliably eliminated, while simultaneously interrupt talk is still detectable. A hands free telephone is, therefore, obtained with which alternating conversations can be conducted as with a conventional telephone without risk of interference, without the user having to accept the disadvantages which are otherwise unavoidable with hands free telephones.

Figure 2:
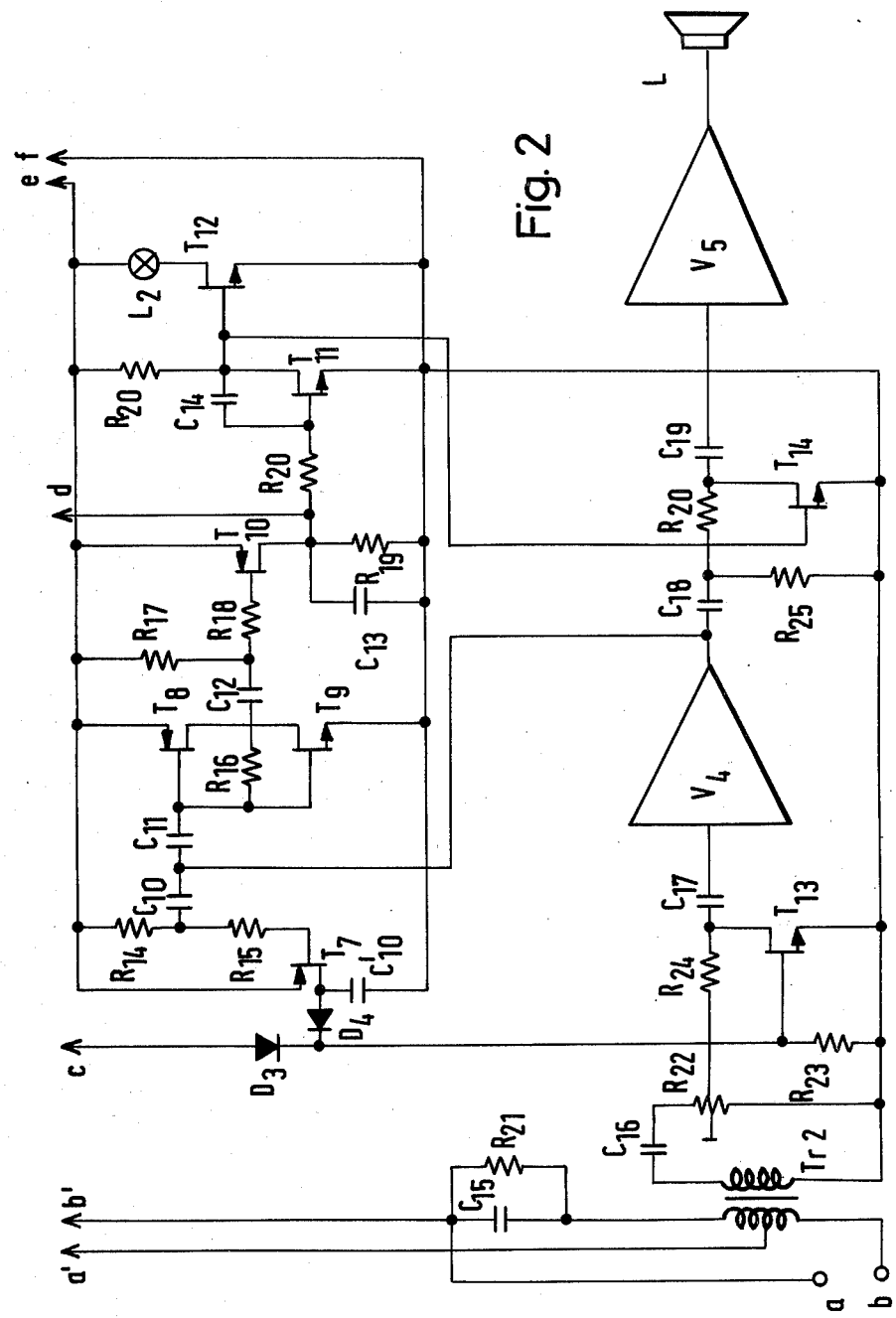

Further particulars, features and advantages of the invention will become clear from the description given hereinbelow. The invention is illustrated in exemplary manner in the accompanying drawing, wherein:

FIG. 1 is a circuit diagram of the receiving channel of a hands free telephone, according to the invention; and FIG. 2 is a circuit diagram of the sending channel of the hands free telephone.

Schematic illustrations are employed in part in order to simplify the figures. Details which are obvious to the expert have also been to the expert have also been omitted in part. Connection points of the two figures have identical letters.

The connection points a and b of the subscriber line to the apparatus may be seen at the bottom left-hand corner of FIG. 2. The microphone Mi can be seen at the top left of FIG. 1 and the loudspeaker L of the hands free telephone at the bottom right-hand corner of FIG. 2.

Referring now to FIG. 1, a speech signal is fed into the sending channel by means of the microphone Mi. The signal passes through the amplifier V1 and the capacitor C1 to a potentiometer R1. The potentiometer P1 which is adjusted during production, provides a basic adjustment of the apparatus for the smallest possible signal to be sent. The signal is fed from the tap of the potentiometer R1 to the amplifier V2 of the sending channel via resistor R2 and capacitor C2. With reference to these and all other circuit details, attention is drawn to the figure, from which all further information can be obtained.

Between the connection point of the resistor R2 to the capacitor C2 and ground or to the negative pole of the voltage supply (cf. FIG. 1 outside right), an MOS transistor $T_0$ is provided. The gate electrode of transistor $T_0$ is connected via resistor R3 to ground or to negative voltage. Consequently, transistor $T_0$ is normally non-conductive. When the transistor $T_0$ is non-conductive, the signal arriving from microphone Mi or from amplifier V1 can immediately reach the amplifier V2 for further processing therein. When the transistor $T_0$ is fully conductive, however, the connection point of resistor R2 and capacitor C2 is grounded so that the incoming signal is not passed on to V2. Obviously, intermediate states which produce partial attenuation of the input signal of the amplifier V2 are also possible. In any case, it is clear that the MOS transistor $T_0$ is a first attenuator in the sending channel.

The input signal which is then fed into the amplifier V2 via the capacitor C2, is amplified, and passes via capacitor C3, resistor R4 and capacitor C4 to the input of amplifier V3. The amplifier V3 constitutes the final amplifier of the sending channel. The output signal of the amplifier V3 passes via the capacitor C5 to the transformer TR1. The secondary winding of transformer TR1 is connected via the connection points a', b' to the circuit of FIG. 2, so that a corresponding signal is passed to the connection points a, b of the subscriber line.

An MOS transistor T1, via which the connection point of resistor R4 and capacitor C4 (at the input of amplifier V3) can be grounded via a resistor R5, is provided as second attenuator in the sending channel. The resistor R5 prevents the sending channel from being so strongly attenuated by the transistor T1 that the channel appears dead to the caller. A party will on the contrary hear room noises at the other party's end even if the latter does not speak. The resistance value of the resistor R5 is selected so that, e.g., a room noise of 50 dB is allowed to pass without attenuating the receiving channel.

The modulation of the transistor T1 is described in further detail hereinbelow.

The output signal of the amplifier V2 is not only passed to the final amplifier of the sending channel, i.e. to the amplifier V3. It is also passed additionally to the connection point of two capacitors C6 and C7, as indicated in the figure. The signal passes via the capacitor C6 to the connection point of two resistors R6 and R7. The gate electrode of MOS-transistor T'2 is connected via these resistors to the positive pole of the current supply. One side of the source-drain path of the transistor T'2 is also connected to the positive supply. The other end of the source-drain path of the transistor T'2 is connected to ground via capacitor C'6, forming a time constant. The connection point between the output of the transistor T2 and the capacitor C'6 is also connected via a diode D1 to the gate electrode of the transistor $T_0$.

The operation of the above discussed circuit is as follows: The modulation obtained by speaking into the microphone Mi results in an output signal at the amplifier V2. This signal modulates the transistor T'2 into a conductive state. The current carried by the source-drain path of the transistor T'2 is passed, after rectification in the diode D1, to the gate electrode of the transistor $T_0$, which is thereby rendered slightly conductive. Therefore, the greater the output signal of the amplifier V2, the more strongly does the first attenuator of the sending channel, constituted by the transistor T0, attenuate the input, so that an optimally uniform signal input at the amplifier V2 is ensured. The charging of the capacitor C'6 and the time constant thereby created compensates very brief amplitude fluctuations in the modulation. A certain uniformity of self-regulation is thereby ensured. Overmodulation of the amplifier is prevented in spite of the still sensitive basic adjustment.

If the resistor R6 is a resistor with variable resistance value, then adaptation to different background noises can be obtained.

The output signal of the amplifier V2, which is applied to the connection point of the capacitors C6 and C7, passes additionally, via the capacitor C7 to the gate electrodes of two MOS-transistors T2 and T3 in push-pull arrangement. These transistors are wired in the manner shown in the figure, so that the source-drain path of the transistor T2 is connected between the positive pole of the current supply and the connection point of a capacitor C'7 and a resistor R8, and the source-drain path of the transistor T3 is connected between the negative pole of the current supply and the connection point of the capacitor C'7 and resistor R8. Due to this mode of modulation, a maximum modulation across the entire voltage range of the current supply is obtained, even though only a small input signal may be applied to C7. The control effect derived from this is therefore very fast, even in the case of a small input signal. The other side of the resistor R8 is likewise connected to the gate electrodes of the transistors T2, T3. Furthermore, the lead of the capacitor C'7 which is not connected to the two drains of the transistors T2 and T3 or to the resistor R8 is connected to the junction of two resistors R9 ad R10. The control electrode of a further MOS-transistor T4 is connected via these resistors to the positive pole of the current supply. The resistance of the resistor R9 determines the amplitude of the signal applied via C'7 to the junction of the resistors R9 and R10 at which the transistor T4 becomes conductive. This actually occurs in the first half wave of the output signal of the amplifier V2, due to the efficacy of the modulation by the transistors T2 and T3 connected in series with their source-drain paths between the positive and negative poles of the current supply.

The source of the transistor T4 is connected to the positive pole of the current supply. The drain of the transistor T4 is connected to the junction of a capacitor C8 and a resistor R11, the other leads of each of which are connected to the negative pole of the current supply. Under the influence of the control by the output signal of the amplifier V2, the capacitor C8 therefore becomes charged through the transistor T4 as a function of the amplitude of the modulation or of the speech voltage. The capacitor C8, together with the resistor R11, forms a time constant. This time constant is sufficiently long that syllable gaps in the speech current, such as appear when the user of the hands free telephone speaks into the microphone Mi, are bridged.

There now appears a direct voltage at the junction between the drain of the transistor T4 and the capacitor C8 and resistor R11. This voltage is also applied, via a further resistor R12, to the gate electrode of a MOS-transistor T5. The source of this transistor T5 is connected to ground, and its drain is connected to the junction between a capacitor C9 and a resistor R13. The drain of the transistor T5 is connected via resistor R13 to the positive pole of the current supply. A connection of the drain of the transistor T5 to the gate electrode of the transistor T5 is provided via the capacitor C9. It is also important that the junction of the capacitor C9 and resistor R13, and the drain of the transistor T5, which is not connected to ground when the transistor T5 is blocked, is connected to the gate electrode of the transistor T1. Transistor T1 constitutes the second attenuator in the sending channel at the input of the amplifier V3.

The operation of this section of the circuit is as follows: With the transistor T5 blocked, the gate electrode of the transistor T1 is connected to positive potential through the resistor R13. The transistor T1 is therefore conductive and attenuates the input of the amplifier V3. If the operator now speaks into the microphone Mi, the signal derived from the output of the amplifier V2 does not enter the subscriber line with full effect due to the attenuation of the input of the amplifier V3 by the transistor T1. The direct voltage from the junction of capacitor C8 and resistor R11 passes via the resistor R12 to the gate electrode of the transistor T5, to render transistor T5 conductive. This causes the transistor T5 to reduce the potential between ground and the junction of capacitor C9 and resistor R13, or to make this junction negative. The negative potential now appears also at the gate electrode of the transistor T1, which thereby becomes blocked. The attenuator, formed by the transistor T1, in the sending channel therefore likewise becomes inoperative. The sending channel thus becomes fully open.

The time co-ordination of this control with the blockage of the other transmission channel, i.e., the receiving channel, is of decisive importance. The positive direct voltage at the junction of the capacitor C8 and resistor R11 is in fact also applied, via the connection point c of FIG. 1, to the corresponding connection point c of FIG. 2 and hence through the diode D3 to the gate electrode of the MOS-transistor T13. This transistor constitutes the first attenuator in the receiving channel, since the receiving channel is constructed completely symmetrically with the sending channel, transistor T13 corresponds to the transistor T0 in the sending channel. The modulation of the transistor T13 by the positive direct voltage makes the transistor T13 conductive, so that the feeding of any signal to the amplifier V4 of the sending channel is prevented, or at least such an input signal is strongly attenuated. The capacitor C9 with the resistor R13 now forms a delay circuit with time constant. The delay in the modulation of the transistor T1 compared to the modulation of the transistor T13 thereby produced ensures that the access of the sending channel to the subscriber line is ensured only when the transistor T13, i.e., the first attenuator in the other transmission path, i.e., the receiving channel, has already been modulated so that the transmission path therein is strongly attenuated. This staggering in time prevents output signals of the final amplifier V3 in the sending channel from being fed to the input amplifier V4 of the receiving channel, and further processed there. Such feeding of signals to the receiving channel would attenuate the sending channel, open the receiving channel and initiate a feedback whistle or else a continual see-saw of the two channels. This effect does not occur, however, because the sending channel is only released for signals entering from the microphone Mi when the transistor T13 has already been rendered conductive to block the receiving channel.

The voltage used for modulating the gate electrode of the transistor T1 is moreover also applied to the gate electrode of a further transistor MOS T6, the source-drain path of which is connected, in series with an, e.g., yellow coloured lamp L1, between the positive and negative poles of the current supply. The transistor T6 is also held conductive by the voltage across the resistor R13 in the state of rest. The yellow lamp L1 therefore lights as long as the sending channel is not fully permeable to speech currents or speech voltages corresponding to the sound pressure received by the microphone Mi. The lamp L1 is extinguished immediately, however, when speech currents from the sending channel flow through the transformer TR1 into the subscriber line. If the yellow lamp L1 is extinguished even though the user of the hands free telephone is not speaking, this indicates that the room noise is too loud and the handset of the telephone must be used in order to continue the conversation.

The sending channel has been explained above and it has simultaneously been shown how this channel itself modulates the attenuators provided therein, i.e., the transistors $T_0$ and T1, and effects a modulation of the receiving channel through the connection points c—c and the diode D3. The receiving channel is of virtually identical construction to the sending channel, so that it is sufficient to draw attention to the correspondences between the two channels. It is therefore unnecessary to explain all the details anew.

Thus the capacitors C10 and C11 of the control section in the receiving channel correspond to the capacitors C6 and C7 in the control section of the sending channel. The resistors R14 and R15 correspond to the resistors R6 and R7. The transistor T7 corresponds to the transistor T2, the diode D4 to the diode D1, the capacitor C'10 to the capacitor C'6. In the same way the modulation of the transistor T10 via the transistors T8 and T9, the resistor R16, the capacitor C12 and the resistors R17 and R18 is comparable to the modulation of the transistor T4 via the transistors T2 and T3, the resistor R8, the capacitor C'7 and the resistors R9 and R10. The junction of the capacitor C13 and the resistor R19 corresponds to the junction of the capacitor C8 with the resistor R11. This junction is connected through the connection point d of FIG. 2 to the connection point d of FIG. 1. This point is connected via the diode D2 to the gate electrode of the transistor $T_0$, which constitutes the first attenuator in the sending channel. When an output signal appears at the amplifier V4 in the receiving channel, due to the resultant voltage at the junction of capacitor C13 and resistor R19, a modulation of attenuator $T_0$ occurs in the same way that a regulation of the input signal of the amplifier V2 occurs through the diode D1 when the sending channel is open. The input signal of the amplifier V2 is thereby regulated strongly downwards and the sending channel is thus strongly attenuated. This modulation corresponds to the modulation of the transistor T13 in the receiving channel through the diode D3 and the connection point c—c starting from the connection point of the capacitors C8 and R11.

Furthermore, the resistor R20 corresponds to the resistor R12, the transistor T11 to the transistor T5, the capacitor C14 to the capacitor C9 and the resistor R20 to the resistor R13. The transistor T12 is comparable with the transistor T6. A red lamp L2 is connected in series with the source-drain path of the transistor T12. This red lamp accordingly lights in the state of rest, but is extinguished as soon as the receiving channel is fully open. If the red lamp L2 is extinguished although the correspondent of the user of the hands free telephone is not speaking at all, then the room noise at the correspondent's end is too loud for the hands free telephone. The conversation must then be continued through a handset.

The capacitor C15 and the resistor R21 form an RC-element which isolates the transformer TR2 highly resistively from the output transformer TR1 of the sending channel. The transformer TR2 is the input transformer of the receiving channel.

In the receiving channel, the capacitor C16 also corresponds to the capacitor C1 in the sending channel. The resistors R22, R23 and R24 are comparable with the resistors R1, R2 and R3. The resistance value of the resistor R23 is selected to be sufficiently low that a limitation of the attenuation of the input amplifier V4 by the transistor T13 is ensured. It is then possible to bring about a changeover from sending to receiving by the correspondent of the user of the hands free telephone interrup t-talking —possibly with raised voice. The MOS-transistor T13 is the first attenuator (in the transmission direction) in the receiving channel and corresponds to the transistor T0. The capacitor C17 couples the input signals to the amplifier V4. The capacitor C18 at the output of the amplifier V4 corresponds to the capacitor C3, the resistor R26 to the resistor R5 and the capacitor C19 to the capacitor C4.

The junction of the capacitor C18 and resistor R26 is connected via a resistor R25 to ground and to the negative pole of the current supply. In the case of a highly resistive T14, this resistor gives a reference potential for the capacitors C18, C19. The resistor R25 in the sending channel acts in the same manner for the capacitors C3 and C4.

The transistor T14 is the second attenuator (in the transmission direction) in the receiving channel and corresponds to the transistor T1. It will however be noticed that the source-drain path of the transistor T14 is connected, not through a resistance, but directly, to the junction of the resistor R26 and the capacitor C19. This is because in the receiving channel, in contrast to the sending channel, there is no necessity to constrain a constant open state of the line beyond what arrives from the subscriber line. A resistor corresponding to the resistor R5 can be provided here, however, if the loudspeaker L is not arranged in the same housing as the microphone Mi. Accordingly this channel is also kept constantly open, so that a duplex circuit is produced. The amplifier V5 feeds the loudspeaker L. MOS-transistors are used for the transistors, because they switch gently and inaudibly to the user of the apparatus, whereas, with other transistors, unpleasant cracking noises frequently appear in the hands free telephone during switching over, due to excessively steep switch impulse flanks. The type of transistor used in each case (npn or pnp) is indicated by corresponding representation of the transistor in the figures.

While the invention has been disclosed and described with reference to a single embodiment, it is apparent that variations may be made therein, and it is intended in the following claims to cover each such variation and modification as falls within the true spirit and scope of the invention.

I claim:

1. In a hands free telephone set including a transmit channel connected to a microphone, a receive channel connected to a loudspeaker and a control circuit connected between said channels to determine the transmission direction of said set by voice controlled switching, each of said channels comprising a first or preamplifier and a second or final amplifier; the improvement wherein each said channel also comprises a first attenuator inserted before the respective said first amplifier and a second attenuator inserted before the respective said second amplifier, said control circuit comprising a separate first delay circuit for each of said transmit and receive channels, the input of said first delay circuits being fed with the preamplified voice signal of the respective channel, the output signal of each said first delay circuit being coupled as an attenuating-signal to the first attenuator of the respective other channel and to a separate second delay circuit, the output signals of said second delay circuits being applied as attenuating signals to the second attenuator of the respective channel.

2. The telephone set of claim 1 wherein said first amplifier of each channel comprises self regulation means for maintaining the amplitude of the output thereof within determined limits.

3. The telephone set of claim 2 wherein said self regulation means comprises means for controlling the degree of attenuation of the first attenuator of the respective channel.

4. The telephone set of claim 1 wherein the delay time of the first delay circuit of each channel is longer than syllable pauses in speech current, in order to bridge such syllable pauses.

5. The telephone set of claim 1 wherein the delay time of the second delay circuit of each channel is longer than the time required for the first attenuator of the other channel to react to the output signal of the first delay circuit.

6. The telephone set of claim 1 wherein said attenuators comprise transistors having output current paths connected in parallel with the inputs of the respective amplifiers.

7. The telephone set of claim 6 wherein said transistors are mos-transistors having their source drain path connected in parallel with the inputs of said amplifier.

8. The telephone circuit of claim 6 whrein a resistor is connected in series with said source-drain paths of said transistor.

9. The telephone set of claim 1 wherein said control circuit comprises a pair of transistors connected in push-pull and having their output current paths connected in series between a positive and negative operating voltage source, and a means applying the output of the first amplifier of each channel to each respective pair of transistors.

10. The telephone set of claim 1 further comprising a third delay circuit connected to a control electrode of the first attenuator in each said channel.

11. The telephone set of claim 10 wherein said third delay circuit comprises a capacitor.

* * * * *